United States Patent [19]

Luginsland et al.

[11] Patent Number: 4,759,800

[45] Date of Patent: Jul. 26, 1988

[54] PROCESS FOR THE IMPROVEMENT OF TITANIUM DIOXIDE PIGMENTS BY POST-TREATMENT

[75] Inventors: Hans H. Luginsland; Franz Rosendahl, both of Leverkusen, Fed. Rep. of Germany

[73] Assignee: Kronos Titan, GmbH, Leverkusen, Fed. Rep. of Germany

[21] Appl. No.: 18,470

[22] Filed: Feb. 25, 1987

[30] Foreign Application Priority Data

Feb. 27, 1986 [EP] European Pat. Off. ........ 86102574.0

[51] Int. Cl.$^4$ ................................................. C09C 1/36
[52] U.S. Cl. .................................... 106/437; 106/438; 106/442; 423/613; 423/240
[58] Field of Search ............................. 106/300, 309; 423/240 R, 613

[56] References Cited

U.S. PATENT DOCUMENTS

| | | | |
|---|---|---|---|
| 3,146,119 | 8/1964 | Ritter | 106/300 |
| 3,647,377 | 3/1972 | Hilgers et al. | 423/613 |
| 3,760,071 | 9/1973 | Brzozowski et al. | 423/613 |
| 3,873,335 | 3/1975 | Schmidt et al. | 106/300 |
| 3,876,442 | 4/1975 | Thomas | 106/300 |
| 4,050,951 | 9/1977 | Piccolo et al. | 106/300 |
| 4,083,946 | 4/1978 | Schurr et al. | 423/613 |
| 4,533,530 | 8/1985 | Hartmann | 423/240 R |

*Primary Examiner*—Paul Lieberman
*Assistant Examiner*—Willie J. Thompson
*Attorney, Agent, or Firm*—Burns, Doane, Swecker & Mathis

[57] ABSTRACT

A process for the improvement of titanium dioxide pigments by a post-treatment, wherein the titanium dioxide pigment produced by any process, in the form of an aqueous suspension and in any order, is treated with an aqueous titanium oxide chloride solution resulting from the scrubbing of off-gases derived from the production of titanium tetrachloride and, optionally, with one or more other water-soluble metal salts which when neutralized form difficult-to-dissolve oxide hydrates and/or other difficult-to-dissolve compounds, and/or optionally with a water-soluble silicate, and where difficult-to-dissolve oxide hydrates and/or other difficult-to-dissolve compounds are precipitated onto the titanium dioxide pigment from the titanium oxide chloride solution and, if present, from the other metal salts and/or the silicate, and where the titanium dioxide pigment thus treated is recovered such as by being separated from the suspension, washed, dried and milled. It is found that such a post-treatment can improve titanium dioxide pigments in various properties such as weather resistance and optical properties.

17 Claims, No Drawings

PROCESS FOR THE IMPROVEMENT OF TITANIUM DIOXIDE PIGMENTS BY POST-TREATMENT

BACKGROUND OF THE INVENTION

1. Field of the Invention

The present invention relates to a process for post-treating titanium dioxide pigment.

2. Description of the Prior Art

Solutions of salts of tetravalent titanium are often used for post-treatment, e.g. titanyl sulphate solutions. Titanyl sulphate solutions, however, have the disadvantage of tending to be unstable. In such solutions, when allowed to rest, the content of dissolved titanium often decreases and sediments are formed. This in turn results in a loss of active substance. Moreover, changes take place in the solution which may lead to variations in the pigment properties that were to be improved by the post-treatment. A further drawback of titanyl sulphate solutions is the fact that their production, and hence their use, is only economically justified if intermediate products are available from the $TiO_2$ pigment production by the hydrolysis of titanyl sulphate solutions in the so-called sulphate process.

Another alternative suggests the use of other compounds of tetravalent titanium for post-treatment, e.g. chlorides as in U.S. Pat. No. 3,146,119. These chlorides of titanium are employed in the form of a solution hereinafter called "titanium oxide chloride solution". Such a "titanium oxide chloride solution" is not intended to mean the solution of the stoichiometric compound $TiOCl_2$, but rather an aqueous solution containing dissolved titanium and hydrochloric acid characterized by its contents of $TiO_2$ and HCl, leaving open which of the numerous potential products of the hydrolysis of titanium tetrachloride are actually present in the solution.

The titanium oxide chloride solution is usually made by dissolving titanium tetrachloride in water or dilute hydrochloric acid-containing aqueous solutions. Preparation of this titanium oxide chloride solution is relatively expensive since elemental chlorine must be used in general to produce titanium tetrachloride. Moreover, $TiCl_4$ is produced at elevated temperatures, and expensive purification steps are required to free titanium tetrachloride from foreign metals, specifically iron, aluminum, vanadium, chromium, etc. As properties, particularly the optical properties, of the titanium dioxide pigment are affected by foreign metals, which form colored ions, the titanium oxide chloride solution was preferably made from the purest titanium tetrachloride as is used for the manufacture of $TiO_2$ pigments by reaction with oxygen in the "chloride process".

SUMMARY OF THE INVENTION

A process was searched for which does not involve these high costs. Through this search, a new process was found for the improvement of titanium dioxide pigments by post-treatment, wherein the titanium dioxide pigment produced by whatever process, in the form of an aqueous suspension and in any order, is treated with an aqueous titanium oxide chloride solution and optionally with one or more other water-soluble metal salts which form difficult-to-dissolve oxide hydrates and/or other difficult-to-dissolve compounds, and/or optionally with a water-soluble silicate, and wherein difficult-to-dissolve (i.e., insoluble or only slightly soluble in water) oxide hydrates and/or other difficult-to-dissolve compounds are precipitated onto the titanium dioxide pigment from the titanium oxide chloride solution and, if present, from the other metal salts and/or the silicate and wherein the titanium dioxide pigment thus treated is recovered such as by being separated from the suspension, washed, dried and milled. Precipitation onto the titanium dioxide pigment can be achieved by neutralization or other known techniques such as by using precipitating reactants or thermal hydrolysis. The aqueous titanium oxide chloride solution used in the process has a hydrochloric acid content corresponding to a mol ratio of HCl to $TiO_2$ of from 3.5 to 10, the solution being obtained in the scrubbing of off-gases developed in the production of titanium tetrachloride by the chlorination of titaniferous raw material.

This process utilizes a titanium source which would otherwise be an environmental nuisance.

DESCRIPTION OF THE PREFERRED EMBODIMENTS

Increasingly stringent regulations for air and water pollution control and the necessity of economizing on chemical processes have made it necessary to reduce the amount of industrial waste by-product and to recycle as much of the usable wastes as secondary feedstock as possible.

In the production of titanium dioxide, the process of oxidizing titanium tetrachloride in the vapor phase ("chloride process"), which generates only solid and gaseous reaction products, is increasingly gaining ground compared with other processes in which titaniferous raw material is digested with acid resulting in large quantities of waste acids, the disposal or reprocessing of which is difficult and expensive.

Titanium tetrachloride is therefore an important feedstock for the titanium dioxide production and is consequently produced in large volumes.

Titanium tetrachloride is produced by the chlorination of titaniferous raw material in the presence of a carboniferous compound. Suitable titaniferous raw materials are natural and synthetic rutiles, titaniferous slags or titaniferous ores, e.g., ilmenite. Suitable carboniferous compounds are anthracite and coke, e.g. petroleum coke.

The raw materials are chlorinated in finely divided particulate form and at high temperatures, the metal oxides contained in them being almost completely transformed into the corresponding metal chlorides which leave the zone of transformation in the form of an essentially gaseous reaction mixture (also called "chloride mixture"). Subsequently the various metal chlorides are separated from the chloride mixture in one or more steps. The titanium tetrachloride thus separated is then freed from the accompanying other metal chlorides and is purified.

The chloride mixture is cooled down to rather low temperatures, e.g. −20° C., in order to recover a sufficient quantity of the highly volatile titanium tetrachloride.

The separation of the majority of the metal chlorides from the mixture and the subsequent phases of the titanium tetrachloride production process involve the generation of off-gases, also called "chlorination off-gases". Besides carbon dioxide, carbon monoxide and possibly nitrogen, these off-gases contain hydrogen chloride and small amounts of the chlorides of titanium, silicon, aluminum, iron, vanadium and other elements. These off-gases must not be discharged into the atmosphere before cleaning. They are therefore scrubbed. Depending on how the scrubbing process is controlled, the resulting solution contains higher or lower levels of $TiO_2$ and different mol ratios of HCl to $TiO_2$. In order to obtain a suitable solution and to be able to make efficient use of its $TiO_2$ level, the scrubbing process has to be controlled in such a way as to obtain the highest possible $TiO_2$ loading in the resultant solution. In addition, care must be taken to ensure that the mol ratio between HCl and $TiO_2$ in the resultant solution is not excessively high. An appropriate scrubbing process is described in DE-A-33 28 675 which corresponds to U.S. Pat. No. 4,533,530, the entire content of which is incorporated by reference.

Titanium oxide chloride solutions obtained by the scrubbing of off-gases derived from the production of titanium tetrachloride and having a hydrochloric acid content which corresponds to a mol ratio of HCl to $TiO_2$ of from 3.5 to 10, were found to be suitable for the post-treatment of inorganic pigments. The range quoted for the mol ratio of HCl to $TiO_2$ is of essential importance for the process to be technically effective. With a mol ratio below 3.5, the titanium oxide chloride solution tends to be unstable. Mol ratios above 10 are likewise disadvantageous as the titanium oxide chloride solution would introduce excessive quantities of acid into the post-treatment system; these excessive acid quantities would require the addition of correspondingly large quantities of alkaline substances. Apart from the higher costs that would be involved, the resulting pigment suspensions would constitute a pollution problem because of their high loadings of water-soluble salts.

The $TiO_2$ content of the titanium oxide chloride solutions is not critical. Its upper limit is due exclusively to the fact that higher $TiO_2$ levels cannot be produced economically by the scrubbing of chlorination off-gases. But titanium oxide chloride solutions with a $TiO_2$ loading of up to say 170 g/l can easily be produced and are superbly suitable for the process of this invention.

In principle, there is no lower limit to the $TiO_2$ content. Generally, one would not use a $TiO_2$ content substantially lower then 50 g/l in order to not use excessive quantities of fluid. If necessary, the titanium oxide chloride solution obtained in scrubbing the chlorination off-gases can be diluted with water before use, the mol ratio of HCl to $TiO_2$ being of course maintained.

Generally, titanium oxide chloride solutions with a $TiO_2$ content between 100 and 170 g/l are particularly suitable.

Since not only titanium tetrachloride, but also the chlorides of the other metals present in the chlorination off-gases are scrubbed out in the scrubbing process, the resulting titanium oxide chloride solutions also contain coloring cations. The amount of these cations depends on the composition of the chlorination off-gases. Two typical examples of such titanium oxide chloride solutions are given in Table 1.

TABLE 1

| Constituent in g/l | Titanium oxide chloride solution A | Titanium oxide chloride solution B |
| --- | --- | --- |
| HCl | 418 | 422 |
| $TiO_2$ | 137 | 130 |
| $SiO_2$ | 1.2 | 1.4 |
| Fe | 0.9 | 0.56 |
| V | 0.25 | 0.23 |
| Mn | 0.095 | 0.085 |

TABLE 1-continued

| Constituent in g/l | Titanium oxide chloride solution A | Titanium oxide chloride solution B |
| --- | --- | --- |
| Al | 0.084 | 0.095 |
| Cr | 0.019 | 0.013 |
| Mol ratio HCl to $TiO_2$ | 6.7 | 7.1 |

Due to their content of coloring cations, these titanium oxide chloride solutions till now have only been used for the treatment of inorganic color pigments, as the percentage of coloring cations is of no significance in these color pigments. In no case have these titanium oxide chloride solutions been assumed to be readily usable for the post-treatment of titanium dioxide pigments without prior removal of the coloring cations or without taking care in the post-treatment to avoid precipitating the coloring cations. The removal of the coloring cations is very expensive and not justifiable economically. Steps preventing the precipitation of the coloring cations, on the other hand, would require either the addition of further substances—which would impair the pigment quality or necessitate further expensive steps—or the observation of conditions in post-treatment which would likewise not lead to optimum pigments.

Surprisingly, it has been found that such a titanium oxide chloride solution is also excellently suitable for the post-treatment of titanium dioxide pigments—even if the coloring cations are not removed and/or their co-precipitation is not prevented.

The invention thus also covers a process for the use of an aqueous titanium oxide chloride solution with a hydrochloric acid content that corresponds to a mol ratio of HCl to $TiO_2$ of from 3.5 to 10, this solution being obtained in the scrubbing of off-gases developed in the production of titanium tetrachloride by chlorination of titaniferous raw material. The process is characterized in that the solution developed in off-gas scrubbing is used for the post-treatment of titanium dioxide pigments without prior elimination of the non-titanium metal ions.

It was not only found that the use of this titanium oxide chloride solution yields titanium dioxide pigments virtually equivalent to titanium dioxide pigments for whose post-treatment other titanium solutions were employed, but that on certain conditions even better titanium dioxide pigments are obtained.

The process of this invention is not only economical, but has the great advantage of reducing environmental pollution.

The post-treatment pursuant to this invention can be applied to titanium dioxide pigment produced by whatever process and having either an anatase or a rutile crystal structure. The pigment may, for instance, be produced by hydrolysis from titanyl sulphate solutions or titanium oxide chloride solutions which pigment is subsequently calcined. The process of this invention is particularly suitable when a titanium dioxide pigment is used that is produced by oxidation of titanium tetrachloride in the vapor phase. In this case, the titanium oxide chloride solution required for the post-treatment is directly recovered from the chlorination off-gas in the production of the titanium tetrachloride used for the manufacture of the titanium dioxide pigment.

By a combination of certain process steps, the present invention offers the unique possibility of utilizing in the process the titanium contained in the chlorination off-gases that are generated in the overall process of production of titanium dioxide via preparation of titanium tetrachloride. Thus, the process is also a process for the production of an improved titanium dioxide from a titaniferous raw material. This process is characterized by the following steps:

(a) Chlorination of the titaniferous raw material in the presence of a reducing agent, a reaction mixture being formed which contains metal chlorides;

(b) Separation of the metal chlorides from the reaction mixture and separation and purification of the titanium tetrachloride from the remaining metal chlorides, thereby generating off-gases;

(c) Reaction of the purified titanium tetrachloride with oxygen in the vapor phase at elevated temperature, producing titanium dioxide pigment and chlorine;

(d) Separation of the titanium dioxide pigment from the chlorine-containing gases;

(e) Recycling of the chlorine-containing gases to Step (a) optionally after a suitable treatment.

(f) Post-treatment of the titanium dioxide pigment, comprising treating the pigment in an aqueous suspension with one or more water-soluble metal salts which when neutralized form difficult-to-dissolve oxide hydrates and/or other difficult-to-dissolve compounds, and optionally with a water-soluble silicate, and precipitation of the difficult-to-dissolve oxide hydrates and/or other difficult-to-dissolve compounds onto the titanium dioxide pigment from this metal salt or these metal salts and optionally from the silicate and separating the treated titanium dioxide pigment from the suspension, and washing, drying and milling it;

(g) Scrubbing of the off-gases obtained in Step (b), thus forming an aqueous titanium oxide chloride solution with a hydrochloric acid content that corresponds to a mol ratio of HCl to $TiO_2$ of from 3.5 to 10; and (h) Using this titanium oxide chloride solution for the post-treatment of the titanium dioxide pigment in Step (f) without prior separation of the other metal salts scrubbed out from the off-gases.

The titanium oxide chloride solution may be used in the usual quantities. It is preferably used at a loading between 0.2 and 2 percent by weight, most preferably between 0.2 and 1 percent by weight, calculated as $TiO_2$ and related to the titanium dioxide pigment. This range is sufficient in general to reach an adequate improvement of the titanium dioxide pigment wherein the presence of the coloring metal ions introduced with the titanium oxide chloride solution generally does not have an adverse effect.

The titanium dioxide pigment may be post-treated exclusively with the titanium oxide chloride solution such as by adding an alkaline reagent to precipitate aqueous titanium dioxide hydrate onto the titanium dioxide pigment. However, further metal salts are preferably used in addition to the titanium oxide chloride solution. In particular, solutions of those metal salts are used which produce uncolored oxide hydrates. The use of other metal salts, however, should not be excluded if it is required for specific purposes. Moreover, it is possible to add other substances in post-treatment in order to precipitate aqueous, uncolored and difficult-to-dissolve other components as for instance phosphate and/or silicate. In a particularly preferred embodiment of the invention, the aqueous titanium dioxide pigment suspension is treated not only with the titanium oxide chloride solution, but also with aqueous solutions of salts of aluminum and/or zirconium and/or with an aqueous silicate solution.

In detail, the post-treatment as a rule, is carried out so as to treat the titanium dioxide pigment in an aqueous suspension with the titanium oxide chloride solution and, optionally, with the other water-soluble metal salts and/or optionally with the water soluble silicate. In case of an acid reaction of the suspension, an alkaline substance or blend of substances is added to the above mixture until at least a neutral reaction is achieved; in case of an alkaline reaction of the suspension, an acid substance or blend of substances is added until the reaction becomes at least neutral. The titanium dioxide pigment treated this way is separated from the suspension, washed, dried and milled.

The various post-treatment substances can be added in whatever order or way. They may, for instance, be added individually in separate solutions. On the other hand it may be advisable to add several metal salts jointly in one solution. The titanium oxide chloride solution, for instance, may be mixed with an acid solution of aluminum salt and/or zirconium salt prior to being used. Apart from the fact that less solutions are used for the post-treatment this way, the results may be particularly beneficial. Sometimes it is advisable to add the titanium oxide chloride solution as the last post-treatment substance. This procedure is beneficial in those cases where the titanium dioxide pigment suspension is alkaline after addition of the other post-treatment substances; the hydrochloric acid content of the titanium oxide chloride solution then serves to neutralize the suspension. It is also possible to add several post-treatment substances at the same time and separately in such a way that the suspension is kept within a certain pH range while they are added.

The post-treatment can for example be carried out in such a way as to treat the aqueous titanium dioxide pigment suspension with a titanium oxide chloride solution in admixture with an acid aluminum salt solution and to add simultaneously, but separately, an alkaline solution of sodium hydroxide and/or sodium aluminate in such a way that the suspension is maintained at a pH between 3.5 and 8, preferably between 4 and 6 while the solutions are being added and that the suspension is then neutralized, if necessary, and that the pigment is then separated from the suspension, washed, dried and milled.

This procedure surprisingly brings about a marked improvement of the weather resistance which is much higher than the improvement in weather resistance that would be achieved with straight aqueous titanium oxide chloride solution. Moreover, with this procedure, the quantity of titanium oxide chloride solution can be reduced when the same results are to be achieved as with the known procedures.

The use, pursuant to this invention, of a titanium oxide chloride solution generated in scrubbing chlorination off-gases may also substantially improve the gloss of the titanium dioxide pigment.

If desired, the post-treatment of the titanium dioxide pigment can be repeated several times, the pigment either remaining in the same suspension between the various post-treatments or being separated from the suspension and slurried anew.

In a suitable type of procedure, an aqueous titanium oxide chloride solution is used that is produced by treating the off-gases resulting from the chlorination of titaniferous raw materials in titanium tetrachloride production, with an aqueous titanium oxide chloride solution of a concentration of 100 to 170 g/l, calculated as $TiO_2$.

This procedure is described in DE-A-33 28 675.

The process of the invention, however, is not limited to this method of producing the titanium oxide chloride solution, but comprises all procedures by which it is possible to produce a titanium oxide chloride solution of a hydrochloric acid content corresponding to a mol ratio of HCl to $TiO_2$ of from 3.5 to 10 by scrubbing the off-gases formed by the chlorination of titaniferous raw material in the production of titanium tetrachloride.

The subsequent examples explain the invention in more detail.

The following tests were employed to evaluate the pigments obtained in the examples.

(aa) Weather resistance

The pigments were incorporated in paints; chalking of the paints was measured as a function of the time of exposure. In detail, the procedure was as follows:

A paste was prepared by passing 75 g of titanium dioxide pigment and 50 g of a medium-oil fatty acid-modified alkyd resin two times over a three-roll mill. 75 g of this paste were then mixed with another 94 g of the resin and with 24.7 g of a solution which consisted of 160 parts of white spirit, 40 parts of ethyl glycol acetate and 24 parts of ethyl glycol. Driers and small amounts of a silicone oil and anti-skinning agent were added to this solution in the usual manner. The paint batch was then applied on a steel panel, pre-dried for one hour, then baked for one hour at 90° C.

The drawdowns were exposed in 20-minute cycles in a carbon arc accelerated weathering machine, each cycle comprising 17 minutes irradiation and 3 minutes sprinkling with water. Chalking was measured to DIN 53159. The number of days required for the onset of chalking was observed visually and was taken as the chalk resistance value.

(bb) Brightness and undertone

Testing was done to DIN 55983 "Comparison of the Color of White Pigments in Mass-tone Systems". Brightness L and undertone b of the air-dried paint were measured on the Hunter LAB photometer.

(cc) Gloss in gloss emulsion paints

Gloss emulsion paints were prepared using a typical formulation of ROHM & HAAS Deutschland GmbH, Frankfurt/Main 1, viz. Formulation ERM-014-184 "High Gloss Exterior Paint Based on PRIMAL AC-507". After a three-day ageing, the gloss emulsion paints thus prepared were applied on Morest cards at 100 microns wet film thickness. The dried films were measured after three days on a gloss meter at angles of 20° and 60° (reflection values).

(dd) Gloss in alkyd resin

A batch of pigment in an alkyd resin of a pigment volume concentration of 20 percent was prepared. A film was applied on a glass panel and air-dried. The gloss of this film was measured on a gloss meter at an angle of 20° (reflection values).

(ee) Foreign metal content

Foreign metal traces were determined by spectral analysis.

The following Examples 1a to 1f are meant to show the superiority of the titanium dioxide pigments post-treated according to the present invention in comparison with titanium dioxide pigments treated in the usual way using a titanyl sulphate solution or a titanium oxide chloride solution prepared from straight titanium tetrachloride.

EXAMPLE 1a

The example was based on 5 kg of a titanium dioxide pigment produced by oxidation of titanium tetrachloride in the vapor phase. This titanium dioxide was employed in the form of an aqueous slurry having a $TiO_2$ content of 350 g/l, adjusted to a pH of 10 by addition of NaOH and a small amount of a polyphosphate. The resulting suspension was heated to 60° C. While the suspension was being stirred and its temperature maintained, the following ingredients were added one after the other:

(1) 385 ml of titanium oxide chloride solution B given in Table 1, corresponding to 1% $TiO_2$ relative to the pigment used. After addition, stirring was continued for 10 minutes;

(2) 1070 ml of a 10% NaOH solution; followed by 10-minute stirring. The pH of the suspension was then 7.3;

(3) 575 ml of a sodium aluminate solution with an $Al_2O_3$ content of 165 g/l and an NaOH content of about 250 g/l, corresponding to 1.9% $Al_2O_3$, related to the pigment used. The suspension was then stirred for 10 min.

(4) 550 ml of an aluminum sulphate solution of an $Al_2O_3$ content of 100 g/l and $H_2SO_4$ content of about 280 g/l, corresponding to 1.1% $Al_2O_3$ related to the pigment used.

Subsequently, the suspension was stirred for 30 minutes after which time it had a pH of about 7.0. The suspension was filtered and the filter cake washed with demineralized water, dried and milled in a micronizer.

EXAMPLE 1b

The procedure was the same as in Example 1a with the exception of the titanium oxide chloride solution and the NaOH solution being added simultaneously within 20 minutes, maintaining the pH of the suspension between 6 and 8.

EXAMPLE 1c

The procedure was the same as in Example 1a with the exception that the titanium oxide chloride solution was not generated by scrubbing chlorination off-gases, but rather by dissolving pure titanium tetrachloride in water up to a $TiO_2$ content of 100 g/l. 500 ml of this solution were used corresponding to 1% $TiO_2$ relative to the pigment used.

EXAMPLE 1d

The procedure was the same as in Example 1b except the titanium oxide chloride solution described in Example 1c was used.

EXAMPLE 1e

The procedure was the same as in Example 1a. However, instead of the titanium oxide chloride solution, a titanyl sulphate solution was used which had a $TiO_2$ content of 100 g/l and about 150 g/l of free $H_2SO_4$, corresponding to 1% $TiO_2$ relative to the pigment used.

EXAMPLE 1f

The procedure was the same as in Example 1b, but the titanyl sulphate solution of Example 1e was used.

The titanium dioxide pigments thus obtained were compared with each other for their weather resistance using the test method described under (aa). The results are shown in Table 2.

TABLE 2

| Example | 1a | 1b | 1c | 1d | 1e | 1f |
|---|---|---|---|---|---|---|
| Ti solution used* | TIW | TIW | TIC | TIC | TIS | TIS |
| Ti solution was added: | | | | | | |
| prior to NaOH | X | | X | | X | |
| simult. with NaOH | | X | | X | | X |
| Days til onset of chalking | 21 | 22 | 19 | 20 | 19 | 20 |

*TIW = titanium oxide chloride solution obtained by scrubbing chlorination off-gases
TIC = titanium oxide chloride solution obtained by dissolving pure titanium tetrachloride in water
TIS = titanyl sulphate solution Table 2 shows that the titanium dioxide pigments post-treated pursuant to the invention (Examples 1a and 1b) are superior in weather resistance to the titanium dioxide pigments post-treated in the commonly known way with titanium oxide chloride solution (Examples 1c and 1d) or with titanyl sulphate solution (Examples 1e and 1f). The superiority of the titanium dioxide pigments post-treated according to the invention is independent of the order of addition, that means it makes no difference whether the Ti solution is added first, followed by the NaOH solution (Example 1a in comparison with Examples 1c and 1e) or whether both substances are added simultaneously maintaining a certain pH range of the suspension (Example 1b in comparison with Examples 1d and 1f).

The following Examples 2a to 2d show that the foreign metals in the titanium oxide chloride solution generated by the scrubbing of chlorination off-gases do not have an adverse effect on the post-treatment of the pigment pursuant to this invention:

EXAMPLE 2a

The examples were based on a suspension which contained 5 kg of a titanium dioxide pigment produced by the oxidation of titanium tetrachloride in the vapor phase. The $TiO_2$ loading in the suspension was 350 g/l. As in Example 1a, the suspension was adjusted to a pH of 10 and was heated to 60° C. While stirring and maintaining the temperature, the following ingredients were added successively:

(1) 500 ml titanyl sulphate solution of a $TiO_2$ content of 100 g/l and a content of free $H_2SO_4$ of about 150 g/l, corresponding to 1.0% $TiO_2$ relative to the pigment used. Stirring was then continued for 10 minutes.
(2) 660 ml of the sodium aluminate solution used in Example 1a, corresponding to 2.2% $Al_2O_3$ relative to the pigment used. The suspension was then stirred for 10 minutes.
(3) 400 ml of the aluminum sulphate solution used in Example 1a, corresponding to 0.8% $Al_2O_3$ relative to the pigment used.

The suspension was further processed as described in Example 1a.

EXAMPLE 2b

The procedure was the same as in Example 2a except that the titanyl sulphate solution was replaced by a titanium oxide chloride solution as in Example 1c, obtained by the dissolution of pure titanium tetrachloride in water, its quantity amounting to 250 ml, corresponding to 0.5% $TiO_2$ relative to the pigment used.

EXAMPLE 2c

The following ingredients were added one after the other to the suspension produced according to Example 2a:

(1) 285 ml of the titanium oxide chloride solution A listed in Table 1, corresponding to 0.8% $TiO_2$ relative to the pigment used; followed by 10-minute stirring.
(2) 765 ml of the sodium aluminate solution used in Example 2a, corresponding to 2.55% $Al_2O_3$, relative to the pigment used; followed by 10-minute stirring.
(3) 255 ml of the aluminum sulphate solution used in Example 2a, corresponding to 0.45% $Al_2O_3$ relative to the pigment used.

The suspension was further processed as described in Example 2a.

EXAMPLE 2d

The same solutions were used as in Example 2c and they were used in the same quantities. In contrast to Example 2c, however, the titanium oxide chloride solution and the aluminum sulphate solution were mixed with each other prior to being added. In detail, the procedure was as follows:

The suspension produced as described in Example 2a was mixed with a quantity of the blended aluminum sulphate/titanium oxide chloride solutions to lower the pH of the suspension down to 4–4.5. Then, within 30 minutes, the majority of the blended solutions was added simultaneously with so much of a sodium aluminate solution to keep the pH of the suspension within a range of 4 to 4.5. Then the remaining sodium aluminate solution was added to adjust the suspension to a neutral pH. The suspension was then further processed as described in Example 2a.

The titanium dioxide pigments thus obtained were evaluated for their weather resistance using the test method described under aa). Moreover, brightness L, undertone b (test bb) and the contents of iron, vanadium and chromium were determined (test ee). The results are shown in Table 3:

TABLE 3

| Example | 2a | 2b | 2c | 2d |
|---|---|---|---|---|
| Ti solution used* | TIS | TIC | TIW | TIW |
| Addition of | | | | |
| Ti and Al separately | X | X | X | |
| blended | | | | X |
| Days till onset of chalking | 13 | 13 | 14 | 16 |
| Brightness L | 97.9 | 97.9 | 97.7 | 97.8 |
| Undertone b | 1.4 | 1.4 | 1.6 | 1.5 |
| Foreign metal content (ppm) | | | | |
| Fe | 31 | 29 | 66 | 62 |
| V | <3 | <3 | 15 | 14 |
| Cr | 3.9 | 3.6 | 5.0 | 5.1 |

*See Table 2 for explanation.

As the limit of visual distinction of differences in L and b is about 0.3 units, no differences in the optical properties can be noticed visually between the pigments post-treated according to the invention and those post-treated in the usual way despite the higher content in foreign metals of the aforementioned pigments (as shown in Table 3). On the other hand, the weather resistance of the pigments post-treated according to the invention is markedly improved. This improvement is particularly pronounced in the pigment produced in Example 2d of Table 3.

The following examples concern a combined post-treatment with $TiO_2$, $ZrO_2$, $SiO_2$ and $Al_2O_3$.

EXAMPLE 3a

The example was based on a suspension which contained 5 kg of a titanium dioxide pigment produced by oxidation of titanium tetrachloride in the vapor phase. The suspension had a $TiO_2$ content of 350 g/l and a pH of 10. It was further processed as described in Example 1a, the following ingredients being added one after the other:

(1) 250 ml of a solution of zirconium orthosulphate of a $ZrO_2$ content of 100 g/l, corresponding to 0.5% $ZrO_2$ relative to the pigment used. The suspension was then stirred for 10 minutes.
(2) 500 ml of the titanyl sulphate solution used in Example 1e of a $TiO_2$ content of 100 g/l, corresponding to 1.0% $TiO_2$ relative to the pigment used. The suspension was then stirred for 10 minutes.
(3) 250 ml of a sodium silicate solution of an $SiO_2$ content of 100 g/l and an $Na_2O$ content of about 30 g/l, corresponding to 0.5% $SiO_2$, relative to the pigment used. The suspension was then stirred for 10 minutes.
(4) 695 ml of the sodium aluminate solution used in Example 1a, corresponding to 2.3% $Al_2O_3$, relative to the pigment used. The suspension was then stirred for 10 minutes.
(5) 350 ml of the aluminum sulphate solution used in Example 1a, corresponding to 0.7% $Al_2O_3$ relative to the pigment used.

The suspension was then processed as describes in the previous examples.

EXAMPLE 3b

Example 3a was repeated with the differences that the titanyl sulphate solution was replaced by 285 ml of the titanium oxide chloride solution A shown in Table 1. Owing to the higher acid content of this solution, the percentage of the sodium aluminate solution had to be raised to 800 ml, corresponding to 2.65% $Al_2O_3$, relative to the pigment used, and the content of aluminum sulphate solution had to be reduced to 175 ml, corresponding to 0.35% $Al_2O_3$ relative to the pigment used in order to finally obtain a neutral suspension.

EXAMPLE 3c

The ingredients were the same as in Example 3b with the only exception that the zirconium orthosulphate solution and the titanium oxide chloride solution were blended with each other prior to being used.

The resulting titanium dioxide pigments were tested as described in Examples 2a to 2d. The results are shown in Table 4:

TABLE 4

| Example | 3a | 3b | 3c |
|---|---|---|---|
| Ti solution used* | TIS | TIW | TIW |
| Days till onset of chalking | 14 | 15 | 17 |
| Brightness L | 98.0 | 98.0 | 98.0 |
| Undertone b | 1.4 | 1.5 | 1.4 |
| Foreign metal content (ppm) | | | |
| Fe | 26 | 54 | 59 |
| V | <3 | 16 | 16 |

TABLE 4-continued

| Example | 3a | 3b | 3c |
|---|---|---|---|
| Cr | 1.9 | 3.0 | 3.1 |

*See Table 2 for explanation.

This table, too, shows that the higher foreign metal content of the titanium dioxide pigments post-treated according to the invention does not impair the optical properties and that these titanium dioxide pigments have a better weather resistance compared with titanium dioxide pigments post-treated in the usual way. This applies especially for the pigment produced in Example 3c in which the titanium oxide chloride solution was blended with zirconium orthosulphate solution prior to being added.

The following examples describe a pigment with improved gloss in gloss emulsion paints:

EXAMPLE 4a 15 kg of a titanium dioxide pigment produced by oxidation of titanium tetrachloride in the vapor phase were employed in the form of an aqueous slurry having a $TiO_2$ content of 450 g/l and a pH of 10.5. The slurry was intensely sandmilled. The suspension was then diluted to a $TiO_2$ content of 350 g/l. At a temperature of 60° C. the following ingredients were added with constant stirring and the temperature being maintained.

(1) 750 ml of a zirconium orthosulphate solution of a $ZrO_2$ content of 100 g/l, corresponding to 0.5% $ZrO_2$ relative to the pigment used. The suspension was then stirred for 10 minutes.
(2) 1850 ml of a sodium aluminate solution with an $Al_2O_3$ content of 166 g/l and an NaOH content of about 250 g/l, corresponding to 2.05% $Al_2O_3$, relative to the pigment used. The suspension was then stirred for 10 minutes.
(3) 1425 ml of an aluminum sulphate solution of an $Al_2O_3$ content of 100 g/l and an $H_2SO_4$ content of about 280 g/l, corresponding to 0.95% $Al_2O_3$ relative to the pigment used.

Stirring was then continued for another 30 minutes and the pH was adjusted to 7.7 with a small amount of $H_2SO_4$. The titanium dioxide pigment was then filtered, washed, dried and milled.

EXAMPLE 4d

The procedure was the same as in Example 4a with the exception that after the addition of zirconium salt, 1500 ml of a titanyl sulphate solution of a $TiO_2$ content of 100 g/l and a content of free $H_2SO_4$ of about 150 g/l, corresponding to 1% $TiO_2$ relative to the pigment used, were added. Moreover, the quantity of sodium aluminate solution was increased to 2180 ml (corresponding to 2.4% $Al_2O_3$) and the amount of aluminum sulphate solution was reduced to 900 ml (corresponding to 0.6% $Al_2O_3$).

EXAMPLE 4c

Example 4b was repeated with the following differences: Instead of titanyl sulphate solution, 875 ml of the titanium oxide chloride solution A mentioned in Table 1 were added. The quantity of titanium oxide chloride solution corresponded to 0.8% $TiO_2$, relative to the pigment used. Moreover, the quantity of sodium aluminate solution was adjusted to 2455 ml, corresponding to 2.7% $Al_2O_3$, relative to the pigment used and the quantity of aluminum sulphate solution was adjusted to 450 ml corresponding to 0.3% Al$_2$O$_3$ related to the pigment used in order to obtain, finally, a neutral suspension.

The suspension was then further processed as shown in Example 4a. The pigment was tested using the method described under (cc). The results are shown in Table 5.

TABLE 5

| Example | 4a | 4b | 4c |
|---|---|---|---|
| Ti solution used* | — | TIS | TIW |
| 20° gloss (in percent) | 28 | 31 | 39 |
| 60° gloss (in percent) | 74 | 76 | 87 |

*See explanations under Table 2

Table 5 shows that the use of titanyl sulphate admittedly may bring about a slight improvement in the gloss of a titanium dioxide pigment in gloss emulsion paints, but that a much greater improvement is achieved by using the titanium oxide chloride solution pursuant to this invention, which solution is obtained by the scrubbing of chlorination off-gases.

In the following examples, TiO$_2$ pigments with very small quantities of post-treatment substances are produced. These pigments are suitable for use in polyethylene, especially in thin polyethylene films.

EXAMPLE 5a

A titanium dioxide pigment produced by the oxidation of titanium tetrachloride in the vapor phase and slurried in water was wet-milled with the addition of NaOH and polyphosphate and adjusted to a TiO$_2$ content of 350 g/l and a pH of 10. 17 liters of this suspension (corresponding to 6 kg TiO$_2$) were mixed with the following substances at a temperature of 60° C. while the suspension was being stirred and the temperature maintained:

(1) 150 ml of an aluminum sulphate solution like in Example 1a with an Al$_2$O$_3$ content of 100 g/l, corresponding to 0.25% Al$_2$O$_3$ relative to the pigment used. Then the suspension was stirred for 10 minutes.

(2) 90 ml of a sodium aluminate solution like the one used in Example 1a (Al$_2$O$_3$ content 165 g/l) corresponding to 0.25% Al$_2$O$_3$, relative to the pigment used.

The suspension was then stirred for 30 minutes and showed a neutral pH. It was further processed as described in Example 1a.

EXAMPLE 5b

The same suspension was used in the same quantity as in Example 5a. The following substances were added at 60° C. under continuous stirring:

(1) 180 ml of the sodium aluminate solution used in Example 5a, corresponding to 0.5% Al$_2$O$_3$ relative to the pigment used. The suspension was then stirred for 10 minutes.

(2) 110 ml of titanium oxide chloride solution obtained by scrubbing chlorination off-gases, with a TiO$_2$ content of 141 g/l and an HCl content of 400 g/l (mol ratio HCl to TiO$_2$=6.2). This quantity corresponded to 0.26% TiO$_2$ relative to the pigment used.

After addition of the titanium oxide chloride solution the suspension had a neutral pH. It was further processed as described in Example 1a. The resulting titanium dioxide pigments were examined for brightness and undertone by test (bb) and for gloss using the test described under (dd). By test (ee), they were checked for the contents of Fe and V. The results are given in Table 6.

TABLE 6

| Example | 5a | 5b |
|---|---|---|
| Ti solution used* | — | TIW |
| Brightness L | 97.59 | 97.57 |
| Undertone b | 1.12 | 1.12 |
| 20° gloss (%) alkyd | 76 | 79 |
| Foreign metal content (ppm) | | |
| Fe | 24 | 37 |
| V | <3 | 5 |

*See explanation in Table 2.

Table 6 shows that the titanium dioxide pigment post-treated pursuant to the invention despite its higher contents of iron and vanadium is equivalent in its optical properties to a known titanium dioxide pigment and better in gloss behavior than the known titanium dioxide pigment.

Perfect blown films could be produced with both pigments.

EXAMPLE 6a

A titanium dioxide pigment was used that was obtained by oxidation of titanium tetrachloride in the vapor phase. This pigment was used in the form of a suspension as described in Example 1a. This suspension, corresponding to 200 g TiO$_2$, was treated with the following ingredients at a temperature of 60° C. while being stirred:

(1) 20 ml sodium silicate solution with an SiO$_2$ content of 100 g/l and an Na$_2$O content of about 30 g/l corresponding to 1% SiO$_2$ relative to the pigment used, followed by 10-minute stirring.

(2) 25 ml of a sodium aluminate solution with an Al$_2$O$_3$ content of 160 g/l and an NaOH content of about 250 g/l corresponding to 2% Al$_2$O$_3$ relative to the pigment used; followed by a 10-minute stirring.

(3) 14.3 ml of the titanium oxide chloride solution A shown in Table 1 corresponding to 1% TiO$_2$ relative to the pigment used; followed by a 10-minute stirring.

At the end of this treatment, the suspension showed a neutral reaction. The pigment was filtered, washed, dried and milled on a lab edge runner.

EXAMPLE 6b

The same additions were made as in Example 6a, but in a different order: titanium oxide chloride solution, followed by sodium silicate and finally sodium aluminate.

The titanium dioxide pigments thus obtained were examined for brightness and undertone by test (bb) and for their contents of iron, vanadium and chromium by test (ee). The results are given in Table 7.

TABLE 7

| Example | 6a | 6b |
|---|---|---|
| Brightness L | 97.80 | 97.67 |
| Undertone b | 1.32 | 1.48 |
| Foreign metal content (ppm) | | |
| Fe | 65 | 63 |
| V | 18 | 19 |
| Cr | 2.7 | 2.7 |

Also in this case, titanium dioxide pigments were obtained that showed good optical properties despite their foreign metal content.

EXAMPLE 7

A titanium dioxide pigment was used produced by hydrolysis of a titanyl sulphate solution in the so-called sulphate process, the pigment having rutile crystal structure. 5 kg of this pigment in the form of a suspension with a $TiO_2$ content of 350 g/l and a pH of 9.5 were used. At 60° C., the following ingredients were added while the suspension was being stirred:

(1) 400 ml of an titanium oxide chloride solution which had been obtained by the scrubbing of chlorination off-gases and which had a $TiO_2$ content of 170 g/l and an HCl content of about 430 g/l (mol ratio HCl to $TiO_2$=5.5). This solution was diluted with water to a $TiO_2$ content of 75 g/l. The quantity used for post-treatment corresponded to 0.6% $TiO_2$ relative to the pigment used. A 10-minute stirring then followed.

(2) 910 ml sodium aluminate solution with an $Al_2O_3$ content of 165 g/l, corresponding to 3% $Al_2O_3$, relative to the pigment used. A 10-minute stirring then followed.

(3) Further, 450 ml of the diluted titanium oxide chloride solution used in Step (1), corresponding to 0.675% $TiO_2$ relative to the pigment was used.

The resulting neutral suspension was stirred for another 60 minutes. The pigment was then filtered, washed, dried and sandmilled. The pigment obtained had very good properties. Only its brightness L to test (bb) was by about one point lower than that of a reference pigment without the addition of titanium oxide chloride.

This titanium dioxide pigment can be used in all fields of an application where no extreme brightness is required.

The invention being thus described, it will be obvious that the same may be varied in many ways. However, such variations are not to be regarded as a departure from the spirit and scope of the invention, and all such modifications are intended to be included within the scope of the following claims.

We claim:

1. A process for post-treating titanium dioxide pigment comprising:
    (a) forming an aqueous suspension of the titanium dioxide pigment;
    (b) wet scrubbing off-gases resulting from the production of titanium tetrachloride by the chlorination of titaniferous raw material to form an aqueous solution of titanium oxide chloride having a hydrochloric acid content corresponding to a mol ratio of HCl to $TiO_2$ of from 3.5 to 10;
    (c) mixing the titanium dioxide pigment suspension with the aqueous solution of titanium oxide chloride without treating the solution for removal of non-titanium metal ions;
    (d) forming a precipitate on the titanium dioxide pigment; and
    (e) recovering the titanium dioxide pigment.

2. The process of claim 1 wherein the titanium dioxide pigment is prepared by the oxidation of titanium tetrachloride in the vapor phase.

3. The process of claim 1 wherein the aqueous solution of titanium oxide chloride is used in amount ranging from 0.2 to 2 percent by weight, calculated as $TiO_2$, relative to the amount of titanium dioxide pigment.

4. The process of claim 3 wherein the aqueous solution of titanium oxide chloride is used in amount ranging from 0.2 to 1 percent by weight, calculated as $TiO_2$, relative to the amount of titanium dioxide pigment.

5. The process of claim 1 wherein the titanium dioxide pigment suspension is treated with at least one aqueous solution of at least one metal salt or silicate or a mixture thereof so as to form a precipitate on the titanium dioxide pigment which is difficult to dissolve.

6. The process of claim 5 wherein the metal salt is a salt of aluminum, zirconium or a mixture thereof.

7. The process of claim 1 wherein the wet scrubbing of off-gases is conducted using an aqueous titanium oxide chloride solution having a concentration of titanium oxide chloride between 100 and 170 g/l calculated as $TiO_2$.

8. The process of claim 1 wherein recovery of the treated titanium dioxide pigment comprises separating the titanium dioxide pigment from the suspension, washing the separated titanium dioxide pigment, drying the titanium dioxide pigment and milling the titanium dioxide pigment.

9. A process for preparing titanium dioxide pigment from titaniferous raw material comprising:
    (a) chlorinating the titaniferous raw material in the presence of a reducing agent to form a reaction mixture which contains metal chlorides including titanium tetrachloride;
    (b) separating the metal chlorides from the reaction mixture and purifying the titanium tetrachloride from the remaining metal chlorides thereby forming off-gases;
    (c) reacting the titanium tetrachloride with oxygen in the vapor phase at an elevated temperature to produce titanium dioxide pigment and chlorine-containing gases;
    (d) separating the titanium dioxide pigment and the chlorine-containing gases;
    (e) recycling the chlorine-containing gases to step (a);
    (f) forming an aqueous suspension of the titanium dioxide pigment;
    (g) wet scrubbing the off-gases to form an aqueous solution of titanium oxide chloride with a hydrochloric acid content corresponding to a mol ratio of HCl to $TiO_2$ of from 3.5 to 10;
    (h) without treating the aqueous solution to separate non-titanium metal ions, mixing the suspension of the titanium dioxide pigment with the aqueous solution of titanium oxide chloride;
    (i) forming a precipitate on the titanium dioxide pigment; and
    (j) recovering the titanium dioxide pigment.

10. The process of claim 9 wherein the titanium dioxide pigment suspension is treated with at least one aqueous solution of at least one metal salt or silicate or mixture thereof so as to form a precipitate on the titanium dioxide pigment which is difficult to dissolve.

11. The process of claim 10 wherein the metal salt is a salt of aluminum, zirconium or mixture thereof.

12. The process of claim 10 wherein the aqueous solution of the titanium oxide chloride includes said at least one metal salt.

13. The process of claim 9 wherein the aqueous solution of titanium oxide chloride is used in amount ranging from 0.2 to 2 percent by weight, calculated as $TiO_2$, relative to the amount of titanium dioxide pigment.

14. The process of claim 13 wherein the aqueous solution of titanium oxide chloride is used in amount ranging from 0.2 to 1 percent by weight, calculated as $TiO_2$, relative to the amount of titanium dioxide pigment.

15. The process of claim 9 wherein the wet scrubbing of off-gases is conducted using an aqueous titanium oxide chloride solution having a concentration of titanium oxide chloride between 100 and 170 g/l calculated as $TiO_2$.

16. The process of claim 9 wherein the precipitate comprises titanium dioxide hydrate.

17. The process of claim 9 wherein recovery of the treated titanium dioxide pigment comprises separating the titanium dioxide pigment from the suspension, washing the separated titanium dioxide pigment, drying the titanium dioxide pigment and milling the titanium dioxide pigment.

* * * * *